United States Patent
Sanders

(10) Patent No.: US 11,490,458 B2
(45) Date of Patent: Nov. 1, 2022

(54) WIRELESS HUB EMULATOR

(71) Applicant: ABL IP Holding LLC, Conyers, GA (US)

(72) Inventor: Alan David Sanders, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 61 days.

(21) Appl. No.: 16/984,252

(22) Filed: Aug. 4, 2020

(65) Prior Publication Data
US 2022/0046757 A1    Feb. 10, 2022

(51) Int. Cl.
| | | |
|---|---|---|
| *H04W 88/16* | (2009.01) | |
| *H04L 67/12* | (2022.01) | |
| *H04L 43/10* | (2022.01) | |
| *H04W 28/02* | (2009.01) | |

(52) U.S. Cl.
CPC ............ *H04W 88/16* (2013.01); *H04L 43/10* (2013.01); *H04L 67/12* (2013.01); *H04W 28/0278* (2013.01)

(58) Field of Classification Search
CPC .. H04W 88/16; H04W 28/0278; H04L 43/10; H04L 67/12
See application file for complete search history.

(56) References Cited

U.S. PATENT DOCUMENTS

| | | | |
|---|---|---|---|
| 5,343,466 A | 8/1994 | Kawamura | |
| 5,974,236 A * | 10/1999 | Sherman | H04W 40/125 709/221 |
| 8,259,648 B2 * | 9/2012 | Pratapagiri | A61B 5/0002 370/328 |
| 9,531,632 B2 | 12/2016 | Hellhake et al. | |
| 9,820,361 B1 | 11/2017 | Turvy, Jr. et al. | |
| 9,883,570 B1 | 1/2018 | Turvy, Jr. et al. | |
| 10,143,056 B2 | 11/2018 | Wagner et al. | |
| 2002/0042274 A1 | 4/2002 | Ades | |
| 2003/0109270 A1 | 6/2003 | Shorty | |

(Continued)

OTHER PUBLICATIONS

Non Final Office Action for U.S. Appl. No. 16/662,691, dated Mar. 8, 2021, 11 pages.

(Continued)

*Primary Examiner* — Christopher M Crutchfield
*Assistant Examiner* — Tito Q Pham
(74) *Attorney, Agent, or Firm* — RatnerPrestia

(57) ABSTRACT

An example radio frequency (RF) communication system includes a gateway server and a plurality of RF nodes. The plurality of RF nodes includes hub RF nodes and member RF nodes. Member RF nodes include a member RF node memory coupled to a member RF node processor, along with member programming in the member RF node memory, which includes functions. The functions configure the member RF nodes to connect to a nodal wireless network via a respective hub RF node. Hub RF nodes include a hub RF node memory coupled to a hub RF node processor, along with hub programming in the hub RF node memory, which includes functions. The functions configure the hub RF nodes to send to a member RF node via the nodal wireless network, an administrative request message. The functions further configure the hub RF nodes to receive from a member RF node an administrative response message.

19 Claims, 8 Drawing Sheets

(56) References Cited

U.S. PATENT DOCUMENTS

| | | | |
|---|---|---|---|
| 2003/0202468 A1* | 10/2003 | Cain | H04L 45/302 370/229 |
| 2004/0218548 A1 | 11/2004 | Kennedy et al. | |
| 2006/0153132 A1* | 7/2006 | Saito | H04W 74/06 370/329 |
| 2006/0242295 A1* | 10/2006 | Husemann | H04W 88/14 709/224 |
| 2007/0097945 A1* | 5/2007 | Wang | H04L 45/26 370/349 |
| 2007/0182571 A1* | 8/2007 | Kennish | G09B 19/0076 340/573.1 |
| 2007/0189256 A1* | 8/2007 | Oh | H04W 74/06 370/338 |
| 2008/0253394 A1* | 10/2008 | Spinar | H04W 28/20 370/468 |
| 2009/0105567 A1* | 4/2009 | Smith | A61B 5/002 600/323 |
| 2009/0175235 A1* | 7/2009 | Spinar | H04W 72/1294 370/329 |
| 2009/0219879 A1* | 9/2009 | Zimmerman | H04W 72/0453 370/329 |
| 2012/0076007 A1 | 3/2012 | Nelson | |
| 2013/0083688 A1* | 4/2013 | Mageed Al-Talib | H04L 61/2092 370/254 |
| 2014/0016488 A1* | 1/2014 | Xu | H04W 52/0206 370/252 |
| 2014/0040483 A1 | 2/2014 | Van Dussen et al. | |
| 2015/0003309 A1* | 1/2015 | Mukherjee | H04W 40/10 370/311 |
| 2015/0208490 A1 | 7/2015 | Bishop et al. | |
| 2016/0219516 A1 | 7/2016 | Subramanian et al. | |
| 2016/0291127 A1* | 10/2016 | Huang | G01S 5/10 |
| 2017/0265046 A1* | 9/2017 | Chen | H04W 12/50 |
| 2017/0325103 A1* | 11/2017 | Casebolt | H04W 72/0446 |
| 2017/0353940 A1 | 12/2017 | Seth et al. | |
| 2017/0366935 A1* | 12/2017 | Ahmadzadeh | H04W 4/80 |
| 2018/0026839 A1 | 1/2018 | Hollinger et al. | |
| 2018/0054237 A1* | 2/2018 | Tseng | H04W 36/0033 |
| 2018/0352414 A1 | 12/2018 | Zhang et al. | |
| 2019/0020572 A1 | 1/2019 | Hu et al. | |
| 2019/0069263 A1 | 2/2019 | Ylamurto et al. | |
| 2019/0197896 A1 | 6/2019 | Bakhishev et al. | |
| 2019/0308579 A1* | 10/2019 | Jouper | G01G 19/07 |
| 2019/0342709 A1 | 11/2019 | Markhovsky et al. | |
| 2020/0077336 A1* | 3/2020 | Moner Poy | H04W 52/0216 |
| 2020/0112508 A1 | 4/2020 | di Marco et al. | |
| 2020/0135028 A1 | 4/2020 | Bakhishev et al. | |
| 2020/0162997 A1* | 5/2020 | Damnjanovic | H04B 7/15542 |
| 2020/0186378 A1* | 6/2020 | Six | G06F 3/04817 |
| 2020/0226895 A1* | 7/2020 | Masters | G08B 25/08 |
| 2020/0274612 A1 | 8/2020 | Shah et al. | |
| 2021/0282032 A1* | 9/2021 | Wen | H04W 24/04 |
| 2021/0345293 A1* | 11/2021 | Park | H04W 88/06 |
| 2021/0352716 A1 | 11/2021 | Baldemair et al. | |
| 2021/0385662 A1* | 12/2021 | Furuichi | H04W 16/14 |
| 2021/0385888 A1* | 12/2021 | Akl | H04W 76/12 |

OTHER PUBLICATIONS

Notice of Allowance for U.S. Appl. No. 16/662,691, dated Mar. 29, 2021, 5 pages.

Notice of Allowance for U.S. Appl. No. 16/825,264, dated Nov. 1, 2021, 8 pages.

Canadian Examination Reportf or Application No. 3,094,674, dated Nov. 5, 2021, 5 pages.

Canadian Examination Report for Application No. 3,095,747, dated Nov. 8, 2021, 5 pages.

Canadian Examination Report for Application No. 3,094,882, dated Nov. 5, 2021, 5 pages.

Non-Final Office Action for U.S. Appl. No. 16/825,264, dated Jul. 23, 2021, 34 pages.

Notice of Allowance for U.S. Appl. No. 16/811,072, dated May 12, 2021, 10 pages.

Qayyum et al., "Multipoint Relaying for Flooding Broadcast Messages in Mobile Wireless Networks," 35th Annual Hawaii International Conference on System Sciences (HICSS 2002), Jan. 2002, Maui, Hawaii, United States, pp. 3866-3875.

Entire patent prosecution history of U.S. Appl. No. 16/811,072, filed Mar. 6, 2020, entitled "Extended Star Luminaire Network Formed Using Heartbeat Messages."

Canadian Examination Report for Application No. 3,112,688, dated Mar. 17, 2022, 5 pages.

Notice of Allowance for U.S. Appl. No. 16/987,740, dated Dec. 30, 2021, 30 pages.

* cited by examiner

WIRELESS HUB EMULATOR

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

Conventional wall switches and light fixtures communicate over wired systems. More recent lighting systems are wireless, which allow communication over a radio frequency (RF) network; however, it is difficult to control these systems as the systems scale in size. Often these systems connect to an outside network via a single wired connection to a single hub node of the RF network; then, that hub node bridges messages from the RF network to the outside network. This system works so long as every node of the RF network can reach the hub node: when some wireless nodes are too far away from that hub node, other networking designs are needed.

Some wireless lighting communication control systems try to resolve this issue by converting some of the wireless nodes into hub nodes, connecting them directly to the outside wired network. This however requires a technician to install a wired connection from the outside network to the new wired hub node, which can be expensive and may cause extended periods of wireless network downtime.

Other wireless lighting communication control systems attempt to resolve this issue by converting some of the wireless nodes into repeater nodes: these repeater nodes forward all of the messages between the hub node and the wireless nodes that are too far away from that hub node. This method often does not require a change in hardware configuration, but this forwarding of messages uses substantially more network bandwidth to repeat messages between the distant wireless nodes and the wired node. Furthermore, in a wireless lighting communication control system, many of the messages are administrative messages that are both necessary and repetitive, or the messaging may be between two wireless nodes that do not concern the hub node. Therefore, the hub node may not require every message sent by a wireless node, but repeater nodes will nevertheless forward every message they receive to that hub node. Additionally, as wireless lighting communication control systems become more elaborate, segmentation of subsystems can improve performance: even though two buildings may be on the same network, does not mean that lighting elements in a first building have any meaningful connection to lighting elements in a second building.

Accordingly, a system is needed to overcome these and other limitations in the art. The described luminaire network's multiple hub nodes aggregate administrative activities and messaging, as well as reduce the number of RF nodes involved in messaging, improving the functionality of the lighting network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6A is the original network, and FIG. 6B is a network with improved connectivity to isolated RF nodes.

DETAILED DESCRIPTION

Figure 1:
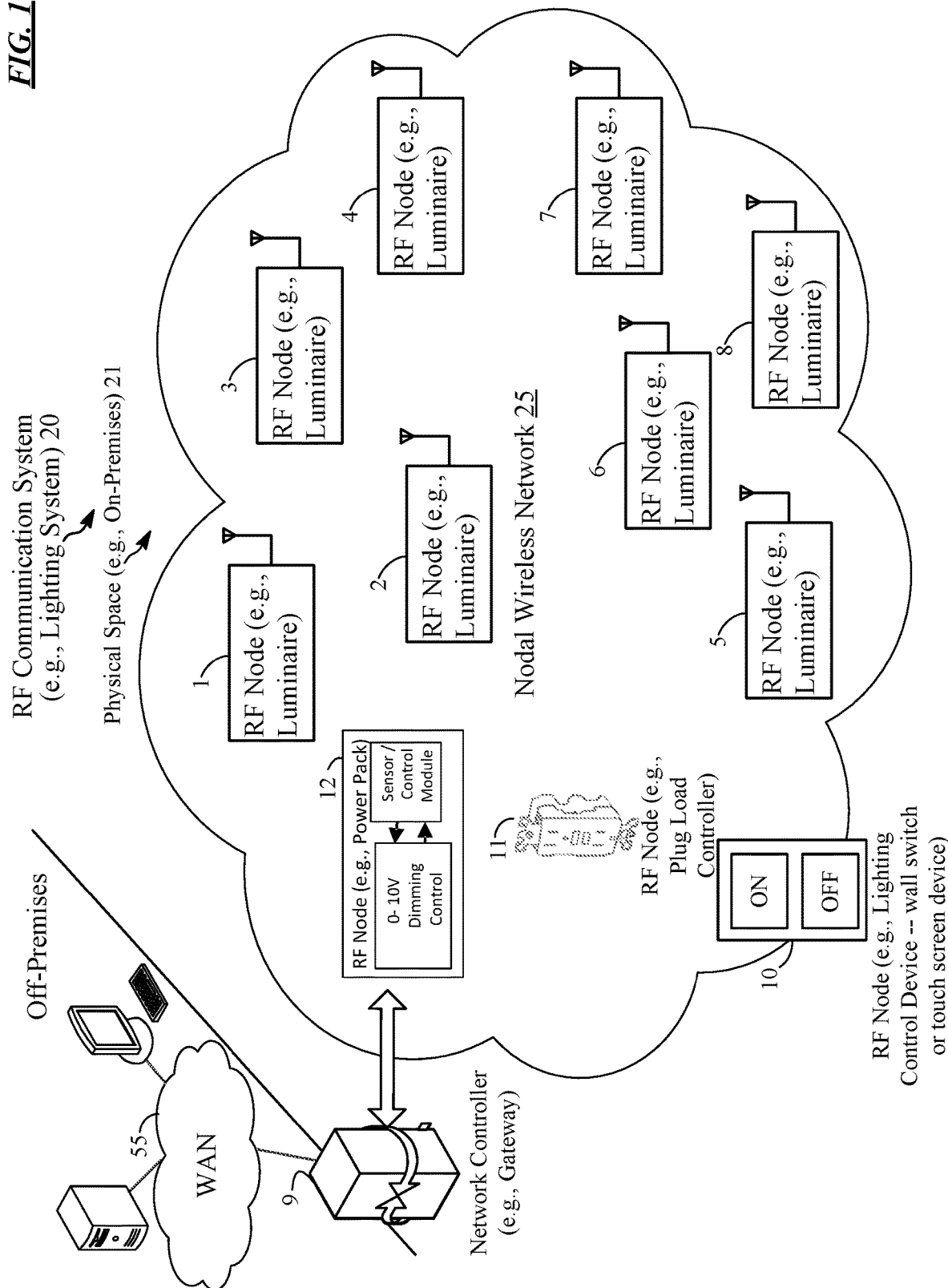
FIG. 1 illustrates a functional block diagram of an example of an RF communication system (e.g., wireless lighting system) that includes a nodal wireless network of RF nodes.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself includes no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 illustrates a functional block diagram of an example of an RF communication system (e.g., lighting system) 20 that includes a nodal wireless network 25 of radio frequency (RF) nodes. The nodal wireless network 25 supports light commissioning/control/maintenance to provide a variety of lighting control, including communications in support of turning lights on/off, dimming, set scene, and sensor trip events. In the example, the eleven RF nodes 1-8, 10-12 include eight luminaires 1-8, a gateway (e.g., network controller) 9, lighting control device 10 (e.g., wall switch or touch screen device), a plug load controller 11, and a power pack 12. The number of RF nodes 1-8, 10-12 in the nodal wireless network 25 (e.g., size) will vary as RF nodes join or leave the nodal wireless network 25; thus, the number of RF nodes may be greater or less than the twelve RF nodes shown.

RF nodes 1-8, 10-12 can execute member and hub programming (elements 242, 342 of FIGS. 2, 3A-C, 4) to designate RF member and hub nodes of the nodal wireless network 25 and a lighting control application (element 240 of FIGS. 2, 3A-C, 4) for communication over the nodal wireless network 25. In the example, RF nodes 1-8 are each a member RF node (see element 200 of FIG. 2), RF node 10-12 are each a hub RF node (see elements 300A-C, 400 of FIGS. 3A-C, 4), network controller 9 is a gateway server (see element 9 of FIG. 5). In addition to being a hub RF node 300A-C, RF node 12 is more specifically a wired hub RF node (see element 400 of FIG. 4).

In a nodal wireless network 25, algorithms are used to designate certain non-wired RF nodes as hub RF node(s) 300A-C, which are capable of forwarding network packets from the gateway 9 or other hub RF nodes 300A-C to member RF nodes 200. The number of member RF nodes 200 and hub RF nodes 300A-C will vary depending on the RF signal strength in various locations of the physical space 21 where the RF nodes 1-8, 10-12 are positioned.

In a lighting system 20, where various luminaires 201, lighting control devices (e.g., wall switch 301 or touch screen device 302)), plug load controllers 401, and power packs 402 are RF nodes 1-8, 10-12, running messaging forwarding programming can be expensive in terms of processing time and electrical energy, even while no messages are being sent. Therefore, the nodal wireless network 25 benefits a balance between few RF nodes 1-8, 10-12 running the hub programming 342 versus the member programming 242. Too many members RF nodes 200 per hub RF node 300A will overwork the hub RF nodes 300A, requiring large amounts of time spent contacting, polling, and tabulating statuses for connected member RF nodes 200. For example, if a lighting system 20 has one hundred member RF nodes 200 and one hub RF node 300A, that single hub RF node 300A will spend massive amounts of time trying to message each of the one hundred member RF nodes to determine their network status.

This nodal wireless network 25 can be applied to lighting systems 20, but in some examples the nodal wireless network 25 can be applied to a wireless industrial device control system as well.

However, too many RF nodes 300A per member RF node 200 will result in too much traffic over the nodal wireless network 25. For example, fifty member RF nodes 200 and fifty hub RF nodes 300A, with one member RF node 200 per hub RF node 300A, would still have incredible messaging overhead. If those fifty member RF nodes 200 and fifty hub RF nodes 300A were instead ninety member RF nodes 200 and ten hub RF nodes 300A, then network traffic would be limited. Reducing the number of hub RF nodes 300A in this example is only practicable if it did not prevent any of the member RF nodes 200 or hub RF nodes 300A from being able to connect to the nodal wireless network 25.

RF nodes 1-8, 10-12 are installed in a physical space (e.g., on-premises) 21, which can be in indoor or outdoor installation area. Each RF node, such as luminaires 1-8, lighting control device 10, plug load controller 11, and power pack 12 can be equipped with a wireless network transceiver. For example, the wireless network transceiver can include a near range Bluetooth Low Energy (BLE) radio that communicates over the nodal wireless network 25 for purposes of commissioning, maintenance, and control operation of the lighting system 20.

Plug load controller 11 plugs into existing AC wall outlets, for example, and allows existing wired lighting devices, such as table lamps or floor lamps that plug into a wall outlet, to operate in the lighting system 20. Plug load controller 11 instantiates a wired lighting device, such as a table lamp or floor lamp, by allowing for commissioning and maintenance operations and processes wireless lighting controls in order to the allow the wired lighting device to operate in the lighting system 20.

Power pack 12 retrofits with existing wired light fixtures (luminaires). Power pack 12 instantiates the wired light fixture by allowing for commissioning and maintenance operations and processes wireless lighting controls in order to allow a wired lighting device to operate in the lighting system 20.

It should be understood that in the example herein, the luminaires 1-8, lighting control device 10, plug load controller 11, and power pack 12 are just one example of an RF node, which includes additional components. Hence, the member 242, and hub programming 442 of FIGS. 2, 3A-C, 4 described herein can be applied to various other types of RF nodes.

Generally, RF nodes 1-8, 10-12 include a subset of components, for example, as shown in FIGS. 2, 3A-C, 4 the RF node includes a wireless transceiver 213, microprocessor 211, and a memory 215, 315, 415 (see FIGS. 2, 3A-C, 4). However, the programming, messages, etc. stored in the main memory 215, 315, 415 varies depending on whether the RF node 1-8, 10-12 is configured as a member RF node 200, hub RF node 300A-C, and wired RF node 400. Hence, the RF nodes 1-8, 10-12 do not have to include the light source 219, LED indicator 321, touch screen 323, driver circuit 217, drive/sense circuitry 225, detector(s) 227, and switch(es) 329 components (see FIGS. 2, 3A-C, 4). RF nodes can be connected together via the nodal wireless network 25.

In some examples the nodal wireless network 25 may also designate some subset of RF nodes 1-8, 10-12 as repeater RF nodes. Repeater RF nodes are able to extend the range of the nodal wireless network 25, without executing hub programming 442. Repeater RF nodes function similarly to member RF nodes 200, except that when repeater RF nodes receive a message not directed to that repeater RF node, the repeater RF node will rebroadcast that message in an attempt to forward the message to the intended recipient. In some examples the repeater RF node may know of neighboring RF nodes that would reasonably be able to receive a rebroadcasted message, and will only rebroadcast messages directed to those neighboring RF nodes.

Figure 2:
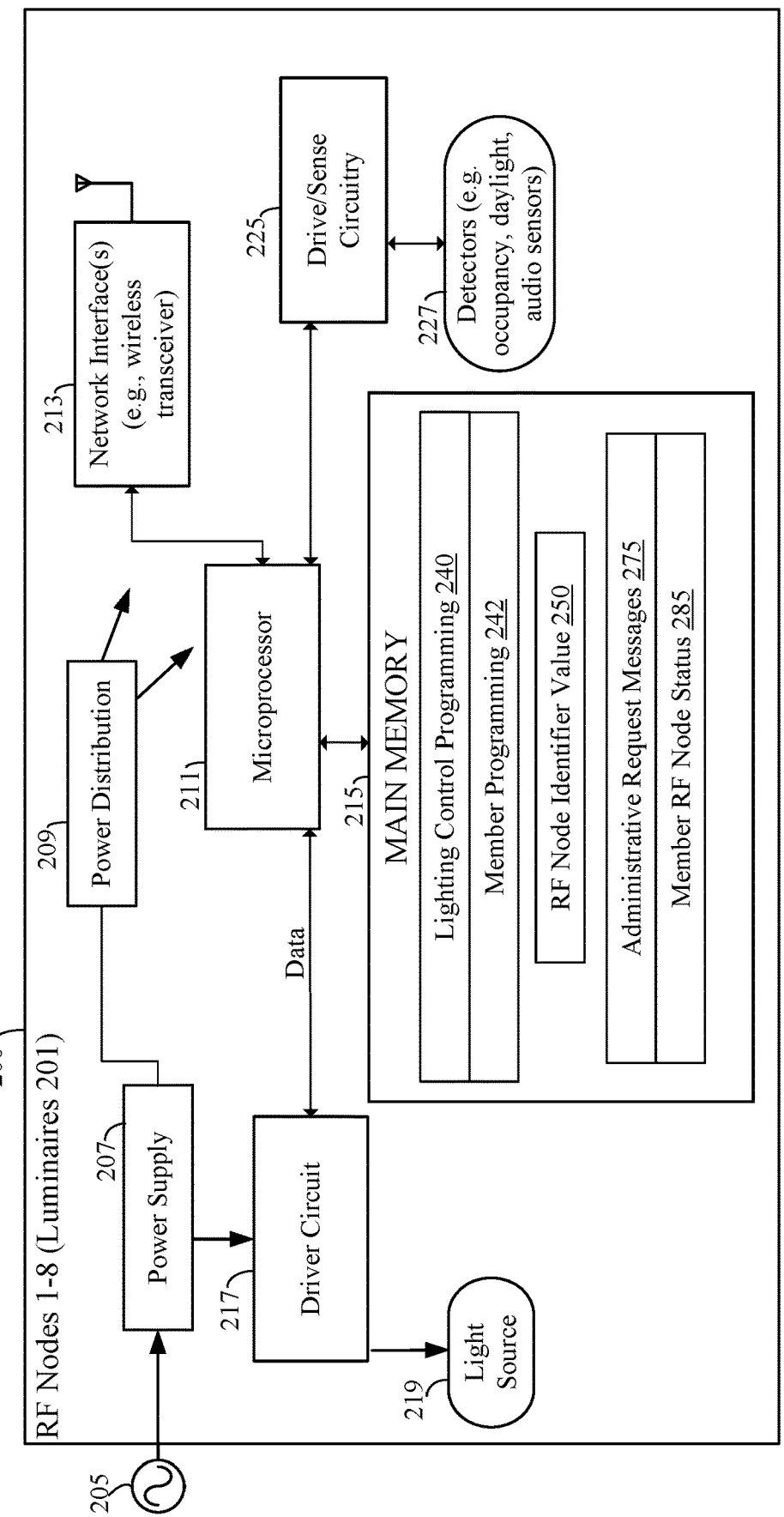
FIG. 2 illustrates a functional block diagram of a lighting system luminaire RF node configured to act as a member RF node.

FIG. 2 is a block diagram of RF nodes 1-8, which are luminaire(s) 201 in the example. In this example of FIG. 2, each of the RF nodes 1-8 are configured as a member RF node 200 that communicates via the nodal wireless network 25 in the lighting system of FIG. 1. The member RF node 200 includes a subset of the components of the luminaire RF node 201 of FIG. 2, including the microprocessor 211, network interface(s) 213, and various programming, messages, identifiers, etc. shown in the main memory 215. In FIG. 2, drive/sense circuitry 225 and detectors 227 can be on-board the luminaire RF node 201. Detectors 227 can be infrared sensors for occupancy or motion detection, an in-fixture daylight sensor, an audio sensor, a temperature sensor, or other environmental sensor. Drive/sense circuitry 225, such as application firmware, drives the occupancy, audio, and photo sensor hardware.

The luminaire RF node 201 includes a power supply 207 driven by a power source 205. Power supply 207 receives power from the power source 205, such as an AC mains, battery, solar panel, or any other AC or DC source. Power supply 207 may include a magnetic transformer, electronic transformer, switching converter, rectifier, or any other similar type of circuit to convert an input power signal into a power signal suitable for light source 219. Light source 219 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 219 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaire RF node 201 further includes, a driver circuit 217, for example, an intelligent light emitting diode (LED)

driver circuit. Driver circuit 217 is coupled to light source 219 and drives that light source 219 by regulating the power to light source 219A by providing a constant quantity or power to light source 219 as its electrical properties change with temperature, for example. The driver circuit 217 provides power to light source 219. Driver circuit 217 may be a constant-voltage driver, constant-current driver, or AC LED driver type circuit that provides dimming through a pulse width modulation circuit and may have many channels for separate control of different LEDs or LED arrays that comprise light source 219. An example of a commercially available intelligent LED driver circuit 217 is manufactured by EldoLED®.

Driver circuit 217 can further include an AC or DC current source or voltage source, a regulator, an amplifier (such as a linear amplifier or switching amplifier), a buck, boost, or buck/boost converter, or any other similar type of circuit or component. Driver circuit 217 outputs a variable voltage or current to the light source 219 that may include a DC offset, such that its average value is nonzero, and/or an AC voltage.

For purposes of communication and control, luminaire RF node 201 is treated as a single or a multi-addressable device that can be configured to operate as a member of the nodal wireless network 25. Luminaire RF node 201 includes power distribution circuitry 209, a microprocessor 211, and a memory 215. As shown, microprocessor 211 is coupled to driver circuit 217 and the microprocessor 211 includes a central processing unit (CPU) that controls the light source operation of the light source 219. Memory 215 can include volatile and non-volatile storage.

The power distribution circuitry 209 distributes power and ground voltages to the processor 211, memory 215, network communication interface(s) 213 (e.g., wireless transceivers), drive/sense circuitry 225, and detector(s) 227 to provide reliable operation of the various circuitry on the luminaire RF node 201.

Network communication interface(s) 213 allows for data communication (e.g., wired or wireless) over various networks, including the nodal wireless network 25. For example, luminaire RF node 201 can includes one band, dual-band, or tri-band wireless radio communication interface system of network communication interface(s) 213 configured for wireless communication via separate radios that operate at three different frequencies, such as sub-GHz (e.g., 900 MHz), Bluetooth Low Energy (BLE) (2.4 GHz), and 5 GHz, for example. At least one wireless transceiver 213 is for communication over the nodal wireless network 25. In some examples the wireless transceiver 213 is able to communicate over at least two frequency bands, and in those examples the wireless transceiver 213 of a hub RF node 300 communicates with member RF nodes 200 over a first frequency band, and communicates with a wired hub RF node 400 over a second frequency band.

Figure 5:
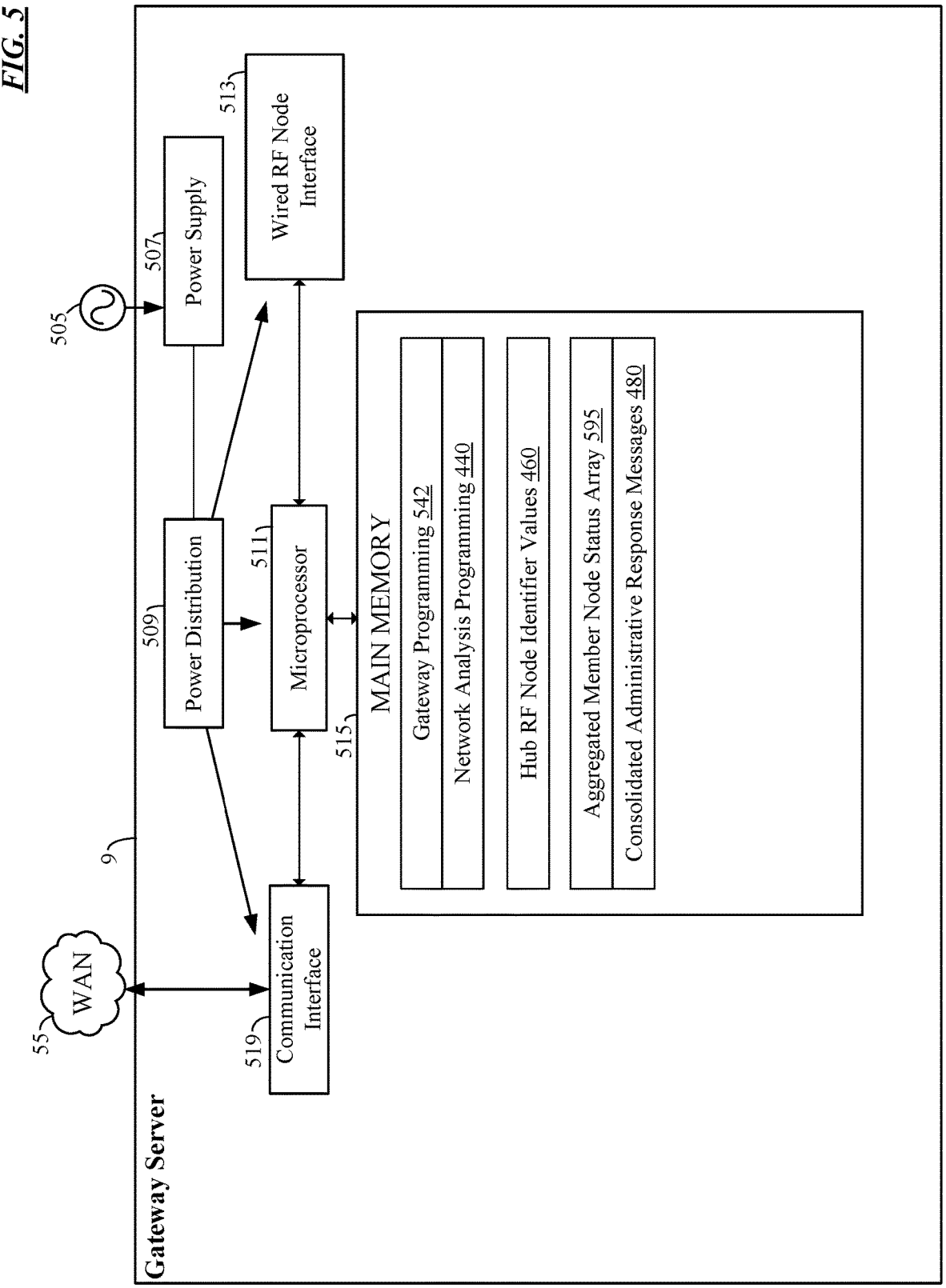
FIG. 5 illustrates a functional block diagram of a gateway server.

Microprocessor 211, including like that shown for the processor/CPU 511 of gateway 9 in FIG. 5, serve to perform various operations, for example, in accordance with instructions or programming executable by processors 211, 511. For example, such operations may include operations related to communications with various lighting system 20 elements, such as RF nodes 1-8, 10-12 during the registration and repeater designation procedures described herein. Although a processor 211, 511 may be configured by use of hardwired logic, typical processors are general processing circuits configured by execution of programming. Processors 211, 511 include elements structured and arranged to perform one or more processing functions, typically various data processing functions. Although discrete logic components could be used, the examples utilize components forming a programmable CPU. A processor 211, 511 for example includes one or more integrated circuit (IC) chips incorporating the electronic elements to perform the functions of the CPU. The processors 211, 511 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in RF nodes 1-8, 10-12.

Memory 215, 315, 415 like that shown in FIGS. 2, 3A-C, 4 and memory 515 like that shown in FIG. 5 are for storing data and programming. In the example, the main memory system 215, 315, 415, 515 may include a flash memory (non-volatile or persistent storage) and a random access memory (RAM) (volatile storage). The RAM serves as short term storage for instructions and data being handled by the processor 211, 511, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with RF nodes 1-8, 10-12, including luminaire 200 wall switch 300A, touch screen device 300B, plug load controller 300C, and power pack 400. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 215, or a memory of a computer used to download or otherwise install such programming into the RF nodes 1-8, 10-12, or a transportable storage device or a communications medium for carrying program for installation in the RF nodes 1-8, 10-12.

As shown, the luminaire 200 includes programming in the memory 215, which configures the processor 211 to control operations of the light source 219, including the communications over the network communication interface(s) 213 via the wireless network interface(s) 213. The programming in the memory 215 also includes lighting control programming 240 to control the light source 219.

This luminaire RF node 201 is configured to operate as a member RF node 200. The luminaire RF node 201 could be configured to operate as a hub RF node 300: the distinction between member RF nodes 200 and hub RF nodes 300A-C is entirely within the memory 215: changing between configuration states does not add or remove hardware components such as the light source 219, detectors 227, LED indicators 321, or AC power relay 433. Alternatively, the luminaire RF node 201 could be configured to operate as a wired hub RF node 400, but this would require the inclusion of a wired communication interface (element 413 of FIG. 4).

This exemplar luminaire RF node 201 includes member programming 242 to configure the luminaire RF node 201 to behave as a member RF node 200. The memory 215 also stores an RF node identifier 250 of the member RF node 200 itself.

The memory 215 further comprises administrative request messages (e.g., heartbeat or polling messages 275). Heartbeat messages are messages intended to convey that the sender is active and able to send messages. Polling messages are requests for information related to the operation of the member RF node 200. The information needed to respond to these requests are stored in the member RF node status 285, comprising operational data related to the respective member RF node 200. The member RF node status 285 may include things such as signal strength, power consumption, and measurements from the driver circuit 217 or the drive/sense circuitry 225.

Execution of the member RF node configuration programming 242 by the processor 211 configures the member RF node 200 to implement functions. These functions include the member RF node 200 connecting to the nodal wireless network 25 via a respective hub RF node 300A-C. The functions further include the member RF node 200 receiving, from the respective hub RF node 300A-C via the nodal wireless network 25, an administrative request message 275. The functions additionally include the member RF node 200 sending to the respective hub RF node 300A-C via the nodal wireless network, an administrative response message (element 375 of FIGS. 3A-C, 4). An administrative response message 375 is the response to an administrative request message 275. For example, the administrative request message 275 could be "how many watts of electricity is this member RF node 200 using?" and the administrative response message 375 would be "This member RF node 200 is using 80 watts of electricity." In this example, the member RF node status 285 would include the fact that the member RF node 200 is using 80 watts of electricity.

Additional functions include the member RF node 200 configuring the member RF node 200 to receive a hub request message. These additional functions include the member RF node 200 configuring the member RF node 200 act as one of the hub RF nodes 300A-C. The function to configure the member RF node 200 may be executed in response to the member RF node 200 receiving a hub request message. These additional functions include the member RF node 200 configuring the member RF node 200 to act as one of the hub RF nodes 300A-C.

Figure 3A:
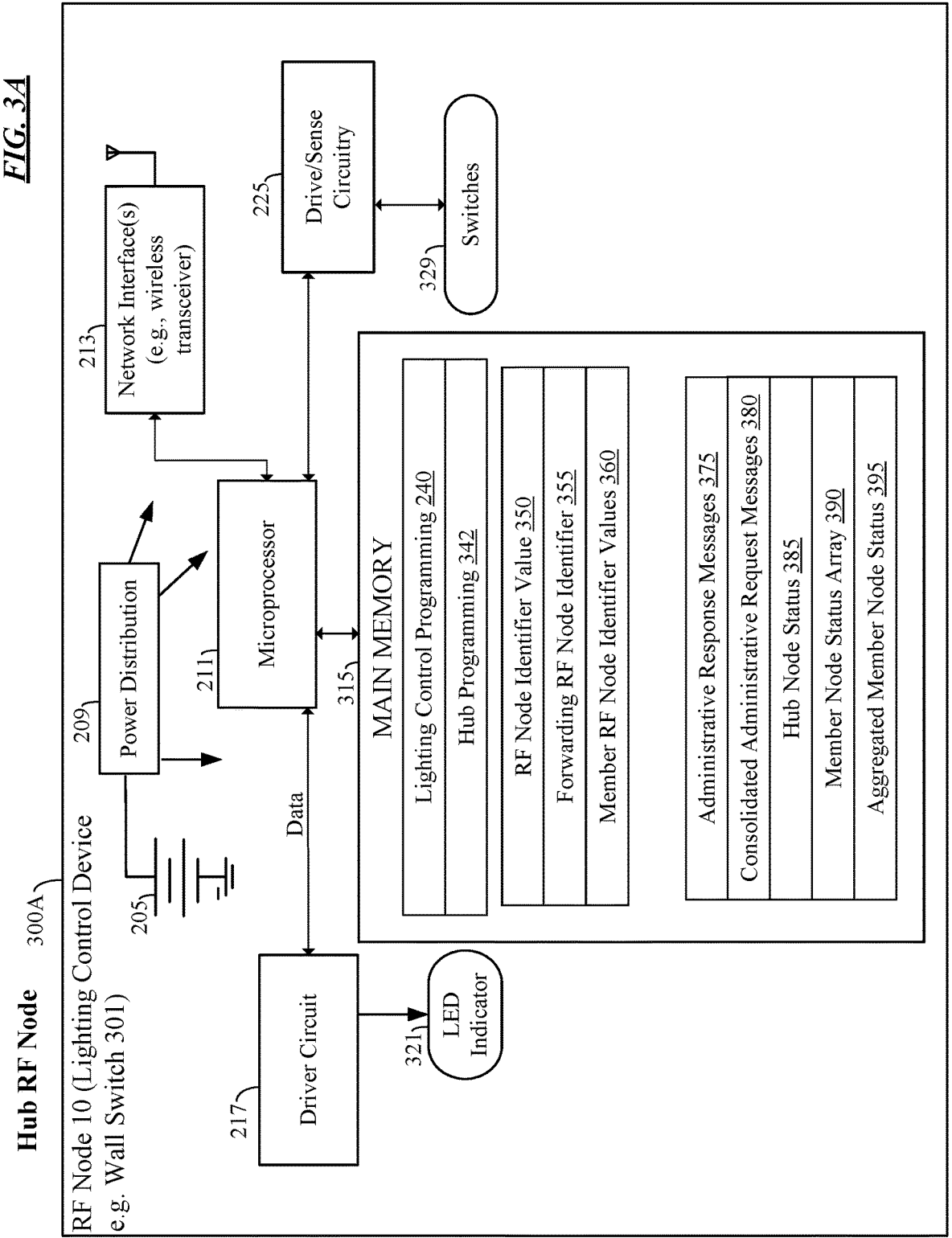
FIG. 3A illustrates a functional block diagram of a lighting system wall switch RF node configured to act as a hub RF node.
Figure 3B:
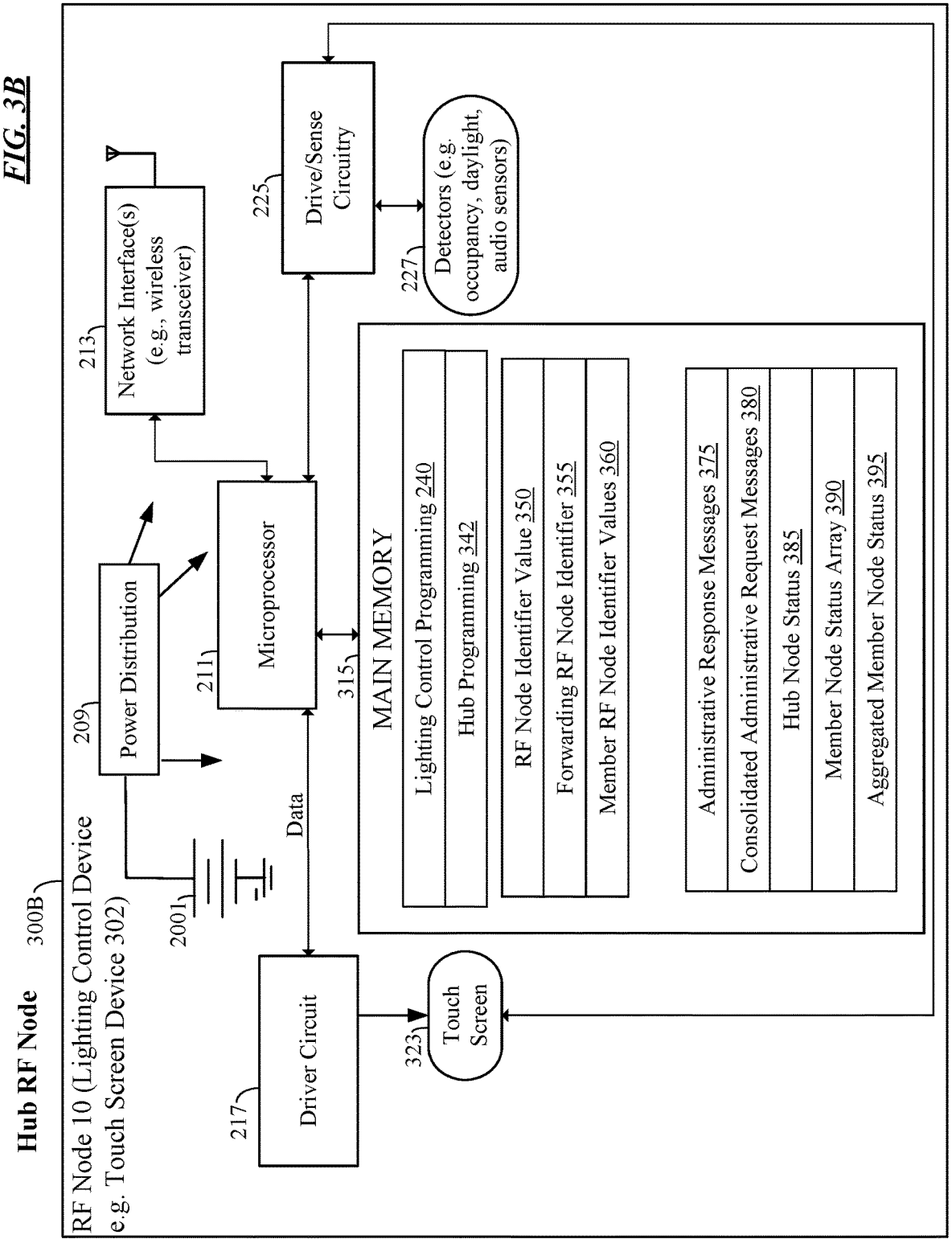
FIG. 3B illustrates a functional block diagram of a lighting system touch screen device RF node configured to act as a hub RF node.

FIGS. 3A-B are block diagrams of two types of lighting control devices 10 that communicate via the flooding wireless network 25 of FIG. 1, specifically a wall switch 301 and a touchscreen device 302. These control devices 10 are also currently configured to act as hub RF nodes 300A-B, and have the requisite elements to perform their necessary functions in the memory 315. The circuitry, hardware, and software of the lighting control devices 301-302, shown are similar to the luminaire 201, including the memory 315. Hence, main memory 315 is shown as including the lighting control programming 240.

This wall switch RF node 301 is configured to operate as a hub RF node 300A. The wall switch RF node 301 could be configured to operate as a member RF node 200: the distinction between member RF nodes 200 and hub RF nodes 300A-C is entirely within the memory 215: changing between configuration states does not add or remove hardware components such as the light source 219, detectors 227, LED indicators 321, or AC power relay 433. Alternatively, the wall switch RF node 301 could be configured to operate as a wired hub RF node 400, but this would require the inclusion of a wired communication interface (element 413 of FIG. 4).

The hub RF node 300A-B includes a subset of the components of the wall switch 301 and touch screen device 302 of FIGS. 3A-B, including the microprocessor 211, network interface(s) 213, and various programming, messages, identifiers, etc. shown in the main memory 315.

This exemplar wall switch RF node 301 include hub programming 342 to configure the wall switch RF node 301 to behave as a hub RF node 300A. The memory 315 includes the hub programming 342, RF node identifier value 350, forwarding RF node identifier 355, member RF node identifier values 360, administrative response messages 375, consolidated administrative request messages 380, hub node status 385, member node status array 390, and aggregated member node status 395. However, as shown, wall switch 301 and touchscreen device 302 can include a subset of the circuitry, hardware, and software shown for the luminaire 201 of FIG. 2.

As shown in FIG. 3A, the RF node 10 is a wall switch 301 where the drive/sense circuitry 225 responds to switches 329. Switches 329 can be an on/off switch, dimmer switch, or set scene switch based on Acuity Brands Lighting's commercially available nLight® AIR rES7 product. In some examples, wall switch 301 includes a single shared button switch 329 for on/off, dimming, or set scene functions and the LED indicator 321 of wall switch 301. A button station can include various button settings that can have the lighting control settings adjusted, for example, four buttons can be arranged with two longitudinal buttons (north-south) and two lateral buttons (east-west).

In FIG. 3B, the RF node 10 is a touchscreen device 302 where lighting control setting adjustments are inputted via a user interface application (not shown) through manipulation or gestures on a touch screen 323. For output purposes, the touch screen 323 includes a display screen, such as a liquid crystal display (LCD) or light emitting diode (LED) screen or the like. For input purposes, touch screen 323 includes a plurality of touch sensors.

A keypad may be implemented in hardware as a physical keyboard of touch screen device 302, and keys may correspond to hardware keys of such a keyboard. Alternatively, some or all of the keys (and keyboard) of touchscreen device 300B may be implemented as "soft keys" of a virtual keyboard graphically represented in an appropriate arrangement via touch screen 323. The soft keys presented on the touch screen 323 may allow the user of touchscreen device 302 to invoke the same user interface functions as with the physical hardware keys.

Drive/sense circuitry 225 is coupled to touch sensors of touch screen 323 for detecting the occurrence and relative location/position of each touch with respect to a content display area of touch screen 323. In this example, drive/sense circuitry 225 is configured to provide processor 211 with touch-position information based on user input received via touch sensors. In some implementations, processor 211 is configured to correlate the touch position information to specific content being displayed within the content display area on touch screen 323. The touch-position information captured by the drive/sense circuitry 225 and provided to processor 211 may include, but is not limited to, coordinates identifying the location of each detected touch with respect to the display area of touch screen 323 and a timestamp corresponding to each detected touch position.

In general, touch screen 323 and its touch sensors (and one or more keys, if included) are used to provide a textual and graphical user interface for the touchscreen device 300B. In an example, touch screen 323 provides viewable content to the user at lighting control device 10. Touch screen 323 also enables the user to interact directly with the viewable content provided in the content display area, typically by touching the surface of the screen with a finger or an implement such as a stylus.

Main memory 315 is shown as including the lighting control programming 240, hub programming 342, RF node identifier value 350 of the hub RF node 300B, member RF node identifier values 360 administrative response messages 375, consolidated administrative request messages 380, a hub node status 385 comprising operational data related to the respective hub RF node 300B. The hub node status may include as an example the number of RF bands the hub RF node 300B is utilizing. The main memory further includes a member node status array 390 comprising the member RF node status 285 of one or more member RF nodes 200 directly connected to the respective hub RF node 300B, and the aggregated member node status 395 comprising an aggregation of the member RF node statuses 285 in the member node status array 390.

This exemplar touch screen RF node 302 includes hub programming 342 to configure the touch screen RF node 302 to behave as a hub RF node 300B. However, as shown, wall switch 301 and touchscreen device 302 can include a subset of the circuitry, hardware, and software shown for the luminaire 201 of FIG. 2.

The main memory 315 of a hub RF node 300B includes, in addition to the elements similar to the member RF node 200, a forwarding RF node identifier 355, which includes the identity of either the gateway server 9, or the closest hub RF node 300A that this hub RF node 300B needs to utilize in order to properly send messages to the gateway server 9 via the nodal wireless network 25. The memory 315 further includes a list of the member RF node identifier values 360, which is a list of the RF node identifier values 250 of every member RF node 200 that is connected to this hub RF node 300B. The memory 315 additionally includes administrative response messages 375, which are messages sent by the member RF nodes 200 that are connected to this hub RF node 300B, sent in response to an administrative request message 275 sent by this hub RF node 300B. The memory 315 still further includes consolidated administrative request messages 380, which are requests from the gateway server 9 or wired hub RF node 400 for an aggregation of individual administrative response messages 375. For example, the consolidated request message 380 sent by the gateway server 9 may ask "are all member RF nodes 200 online?" Rather than receive an "online" message, or assume a lack of response indicates an offline node, for each member RF node 200, the gateway server 9 will receive a single message from each hub RF node 300B, indicating "all member nodes are online" or "member nodes 1, 3, and 5 are not online." Hub RF nodes 300B managing their own network connection quality and reporting aggregated results substantially cuts down on network overhead: status messages from all member RF nodes 200 are not sent to the gateway server 9, being forwarded by every hub RF node 300A-C they pass by; instead, each hub RF node 300B can send a single aggregated message.

Administrative messages are not limited to status message. For example, in a lighting system 20 with multiple floors, there may be different luminaire RF node 201 models on different floors: the lobby may have incandescent-style chandeliers, the upper floors may have standard fluorescent office lighting controlled by light switches, and the basement may have motion-sensitive fluorescent lights. In a system with a single main hub RF node 300B, if a firmware update applies to the basement lights, the hub RF node 300B needs to store that basement firmware update until all of the basement lights update. If a different upper floor firmware update also applies to the upper floor office lighting, the hub RF node 300B needs to store both the basement and upper floor updates, and must attempt to update all of the lights on both the upper floors and the basement. However, in a system with multiple hub RF nodes 300B, where a hub RF node 300A-C is located on each floor, the main hub RF node 300B can send the upper floor update to the upper floor hub RF node 300A, and the basement update to the basement hub RF node 300C. Then, the upper floor hub RF node 300A is solely responsible for updating the firmware on the upper floor office lights, and the basement hub RF node 300C is responsible for updating the firmware on the basement floor lights. This splits the work required in updating over multiple hub RF nodes 300A, 300C, and additionally frees up the main hub RF node 300B to perform other network trafficking tasks. The main hub RF node 300B needs to only keep track of how well the upper floor hub RF node 300A and basement hub RF node 300C are performing at their updating task, rather than tracking how each and every member RF node 200 is performing at updating.

Execution of the hub programming 342 by the processor 211 of the hub RF node 300B configures the hub RF node 300B to perform functions. These functions include the hub RF node 300B sending, to a respective member RF node 200 via the nodal wireless network 25, an administrative request message 275. The functions further include the hub RF node 300B receiving, from the respective member RF node 200 via the nodal wireless network 25, an administrative response message 375. The functions may also include the hub RF node 300B receiving a consolidated administrative request message 380. The functions further include the hub RF node 300B consolidating one or more administrative response message 375 into a consolidated administrative response message (element 480 of FIGS. 4, 5). The functions additionally include the hub RF node 300B sending the consolidated administrative response message 480 (e.g., consolidated heartbeat or polling messages 380). Consolidated heartbeat messages are made up of heartbeat messages, and convey the overall health of the underlying member RF nodes 200 in a single message. Consolidated polling messages are made up of polling messages, and convey overall information regarding the underlying member RF nodes 200 in a single message.

The functions in the hub programming 342 when executed by the processor 211 of the hub RF node 300B configure the hub RF node 300B to perform additional functions. These additional functions include the hub RF node 300B configuring the hub RF node 300B to act as one of the member RF nodes 200. The additional functions further include the hub RF node 300B forwarding message from a first member RF node 1 to a second RF member node 2, forwarding messages from the first or second member RF node 3 to a another hub RF node 10, and forwarding messages from the other hub RF node 10 to the first or second member RF node 3. Further functions include the hub RF node 300B analyzing network traffic over the nodal wireless network 25, as well as the hub RF node 300B sending a hub request message.

In some examples, the hub RF node 300B will only have a single wireless outgoing connection toward the network direction of the gateway server 9. In these examples, the overall network forms a tree structure, with member RF nodes 200 as leaves on branches that are hub RF nodes 300B. In other examples, the hub RF node 300B might have multiple wireless connections to hub RF nodes 300A, C that are all closer to the gateway server, in these examples, the overall network forms a graph structure, with messages having multiple routes through hub RF nodes 300A-C to get from a member RF node 200 to the gateway server 9.

Figure 3C:
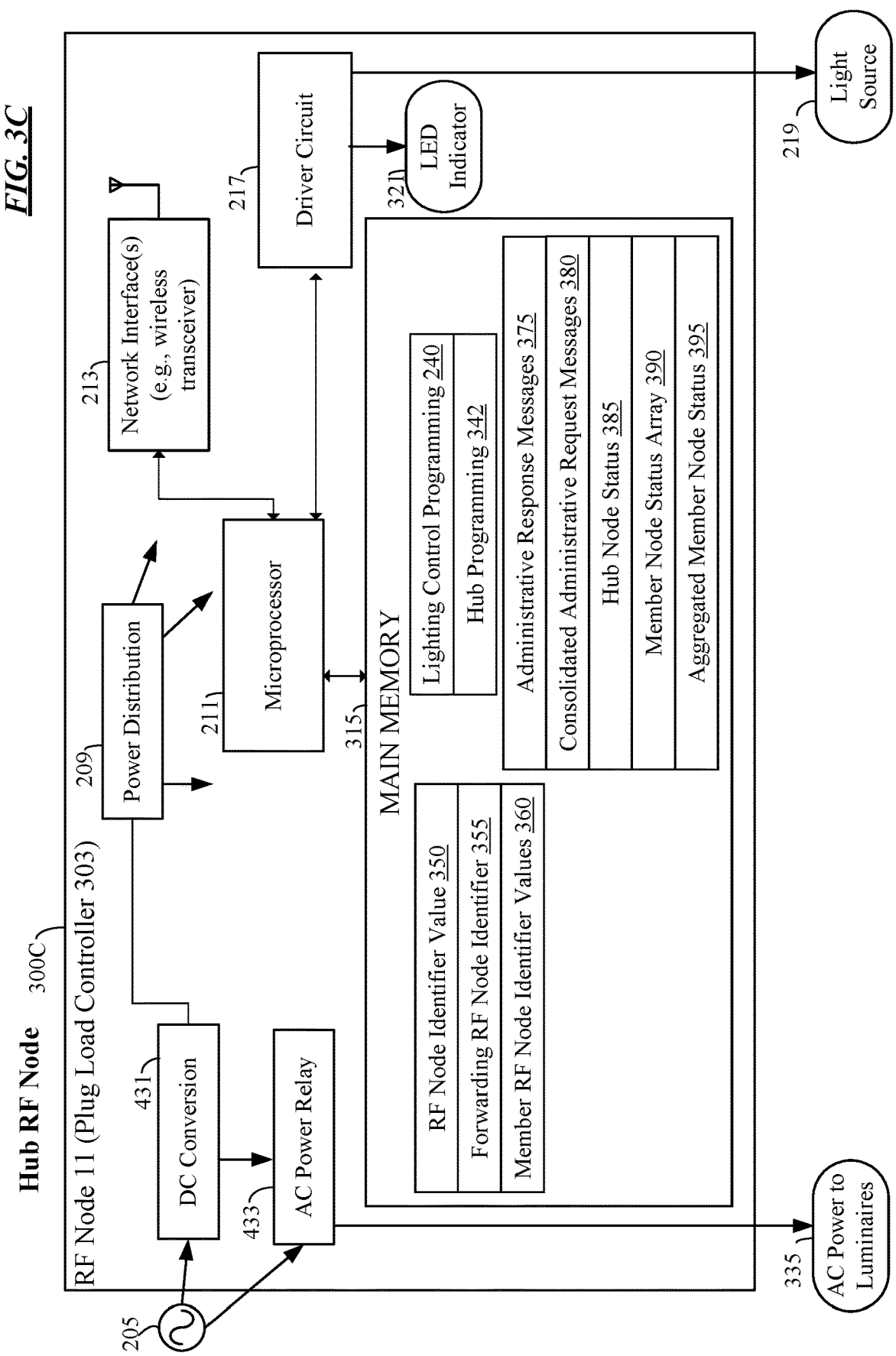
FIG. 3C illustrates a functional block diagram of a lighting system plug load controller RF node configured to act as a hub RF node.

FIG. 3C is a block diagram of a plug load controller 303 type of RF node 11 that communicates via the flooding wireless network 25 of FIG. 1. The circuitry, hardware, and software of plug load controller 303 shown is similar to the luminaire 201 of FIG. 2. Hence, main memory 415 is shown as including the lighting control programming 240.

This plug load controller RF node 303 is configured to operate as a hub RF node 300C. The plug load controller RF node 303 could be configured to operate as a member RF node 200: the distinction between member RF nodes 200 and hub RF nodes 300C is entirely within the memory 215: changing between configuration states does not add or remove hardware components such as the light source 219, detectors 227, LED indicators 321, or AC power relay 433. Alternatively, the plug load controller RF node 303 could be configured to operate as a wired hub RF node 400, but this would require the inclusion of a wired communication interface (element 413 of FIG. 4).

This exemplar plug load controller RF node 303 includes the same programming in the memory 315 as the touch screen device 302.

Plug load controller 303 is a retrofit device that plugs into existing AC wall outlets, for example, and allows existing wired lighting devices, such as table lamps or floor lamps that plug into a wall outlet, to operate in the lighting control system. The plug load controller 303 instantiates the table lamp or floor lamp by allowing for commissioning and maintenance operations and processes wireless lighting controls in order to the allow the lighting device to operate in the lighting system 20. As shown, plug load controller 303 includes a DC conversion circuit 431 (which may instead be a power supply) driven by a power source 205, in our example, an AC line or mains. Power source 205, however, may be a battery, solar panel, or any other AC or DC source.

DC conversion circuit 431 receives power from the power source 205, and may include a magnetic transformer, electronic transformer, switching converter, rectifier, or any other similar type of circuit to convert an input power signal into a suitable power signal to power itself. Plug load controller 303 further comprises an AC power relay 433, which relays incoming AC power from power source 205 to other devices that may plug into the receptacle of plug load controller 400A thus providing an AC power outlet 435.

Plug load controller 303 further includes a driver circuit 217 to drive the external light source 219 of the table or floor lamp, for example. The LED indicator 321 indicates the state of the plug load controller 400A, for example, during commissioning and maintenance procedures.

Figure 4:
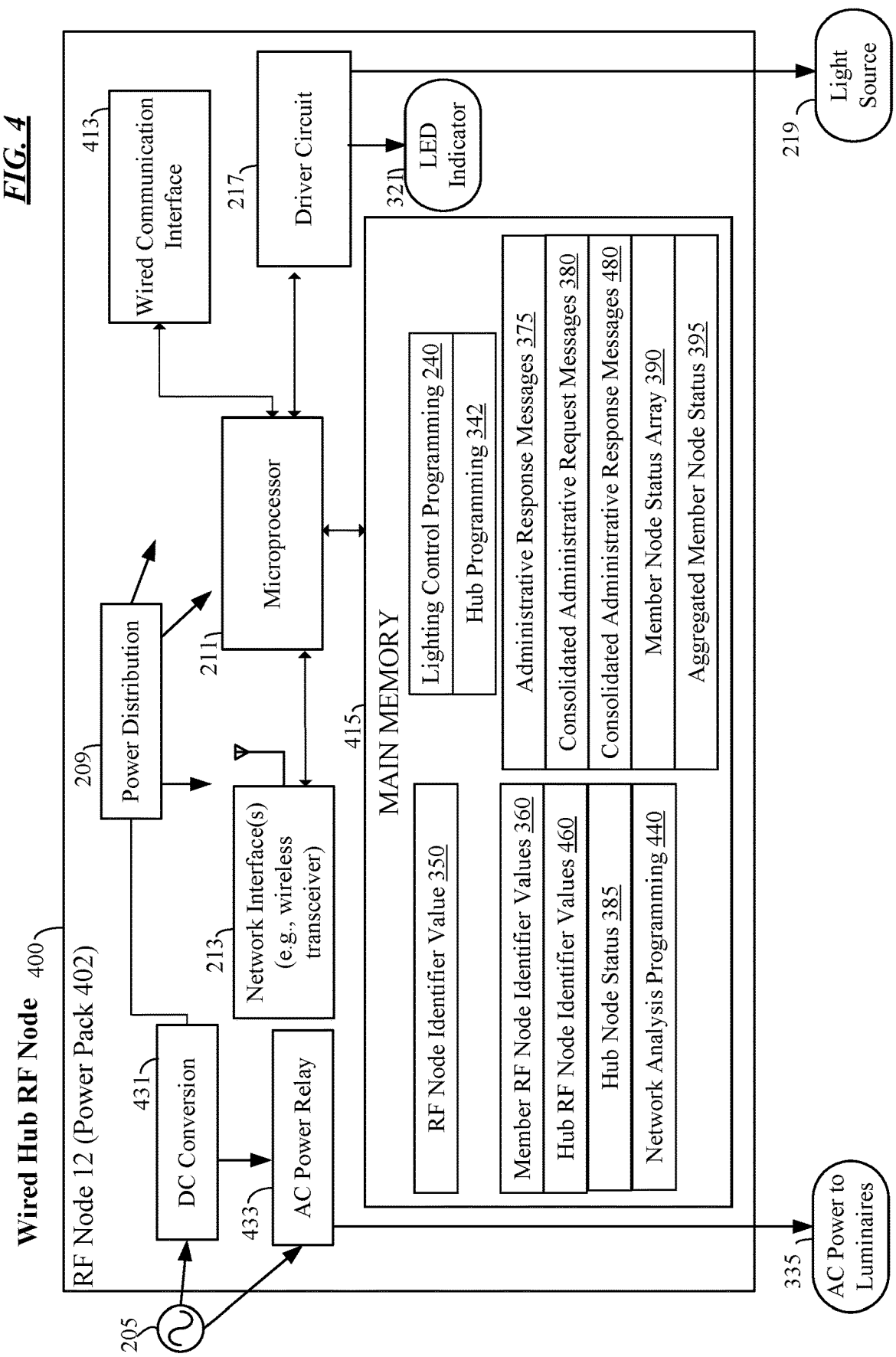
FIG. 4 illustrates a functional block diagram of a lighting system power pack RF node configured to act as a wired hub RF node.

FIG. 4 is a block diagram of a power pack 402 that communicates via the nodal wireless network 25 of FIG. 1. The circuitry, hardware, and software of plug load controller 402 shown is similar to the luminaire 200 of FIG. 2 and plug load controller 303 of FIG. 4A. Hence, main memory 415 is shown as including the lighting control programming 240, repeater RF node configuration programming 442, RF node identifier value 450, forwarding RF node identifier 455, help request count 460, RF node hop distance value 465, heartbeat message 475 and timer 476, help request messages 480 and timer 481, help acknowledged messages 485 and timer 486, active utilization messages 490 and timer 491, and registration messages 495.

Power pack 400B is a device that retrofits with existing wired light fixtures (luminaires). The power pack 400B instantiates the wired light fixture by allowing for commissioning and maintenance operations and processes wireless lighting controls in order to allow the lighting device to operate in the lighting system 20.

This exemplar power pack RF node 402 includes hub programming 342 to configure the power pack RF node 402 to behave as a wired hub RF node 400. A wired hub RF node 400 has all of the features of a hub RF node, found in FIGS. 3A-C. A wired hub RF node 400 however additionally includes a wired communication interface 413. This wired communication interface 413 may be a high-speed modem, an Ethernet (optical, cable or wireless) card or any other appropriate data communications device. The physical communication link(s) to/from the gateway network interface 519 may be optical or wired. Although other wired transceiver arrangements may be used, the example wired hub RF node 400 utilizes an Ethernet card to directly connect to the wired RF node interface (example 513 of FIG. 5) of the gateway server 9.

In some examples, the wired hub RF node 400 performs network control operations; in others, the gateway server performs the network control operations. In examples where the wired hub RF node 400 performs network control operations, the memory 415 of the wired hub RF 400 includes network analysis programming 440. This network analysis programming 440 when executed by the processor 211 of the wired hub RF node 400 configures the wired hub RF node 400 to perform functions, and these functions include the wired hub RF node analyzing network traffic over the nodal wireless network 25. This may make use of the consolidated administrative response messages 480 received from other hub RF nodes 300A-C in the nodal wireless network 25. With this data, the analysis may conclude that the nodal wireless network 25 would be better served if a particular member RF node 200 was acting as a hub RF node 300A-C. Further functions include the wired hub RF node 400 sending a hub request message. This is the message sent directing a member RF node 200 to configure itself to act as a hub RF node 300A-C. The wired hub RF node 400 can also send a member request message, which directs a hub RF node 300A-C to act as a member RF node 200.

FIG. 5 is a functional block diagram of the gateway server 9, by way of just one example of a computing device platform that may perform the functions of the gateway server 9. Gateway server 9 will generally be described as an implementation of a server or host type computer, e.g. as might be configured as a blade device in a server farm or in network room of a particular premises. Gateway server 9 may comprise a mainframe or other type of host computer system. As shown, gateway server 9 includes a wired RF node interface 513 similar to the wired communication interface 413 of the wired hub RF node 400. The gateway server 9 communicates with the nodal wireless network 25 RF nodes 1-8 and 10-11 installed in the physical space 21 via the wired hub RF node 400 (the power pack node 12). Gateway server 9 also includes another gateway network interface 519 for off-premises network communications over the WAN 55.

The gateway server 9 in the example includes a central processing unit (CPU) 511 formed of one or more processors, and a main memory 515. The circuitry forming the CPU 511 may include a single microprocessor, or may include a number of microprocessors for configuring the computer system as a multi-processor system, or may use a higher speed processing architecture. The main memory 515 in the example includes ROM, RAM and cache memory; although other memory devices may be added or substituted.

The gateway server 9 also includes one or more input/output interfaces for communications, shown by way of example as a gateway network interface 519 for data communications via the WAN 55 as well as a wired RF node interface 513 for communications with the wired hub RF node 400. Gateway network interface 519 may be a high-speed modem, an Ethernet (optical, cable or wireless) card or any other appropriate data communications device. The physical communication link(s) to/from the gateway network interface 519 may be optical, wired, or wireless (e.g., via satellite or cellular network). Although other wired transceiver arrangements may be used, the example gateway server 9 utilizes an Ethernet card to directly connect to the wired communication interface 413 of the wired hub RF node 400.

Although not shown, the computer platform configured as the gateway server 9 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the gateway server 9 for control and programming of the system from remote terminal devices via the Internet or some other link via WAN 55.

The gateway server 9 runs a variety of applications programs and stores various information in a database or the like for control of the fixtures, wall controllers, and any other elements of the lighting system 20 and possibly elements of an overall building managements system (BMS) at the premises. One or more such applications, for example, might enable asset tracking, lighting control through the gateway 9 and/or lighting control based on input from the sensors or wall controllers.

In the example of FIG. 5, the gateway server 9 includes a gateway wired RF node interface 513 configured for data communication over a wired connection. The gateway server 9 further includes a gateway network interface 519, configured for data communication over a network 55. Gateway server 9 includes a gateway processor 511, and a gateway memory 515 coupled to the gateway processor 511. The gateway server 9 includes gateway RF node configuration programming 548 in the memory.

Execution of the network analysis programming 440 by the processor 511 configures the gateway server 9 to perform functions. These functions include the gateway server 9 analyzing network traffic over the nodal wireless network 25, and the gateway sending a hub request message. The network analysis programming 440 in the gateway server 9 works the same way as network analysis programming 440 in a wired hub RF node 400 in examples where the wired hub RF node includes network analysis programming. The gateway server 9 also has gateway programming 542. Execution of the gateway programming 542 by the processor 511 of the gateway server 9 configures the gateway server 9 to perform functions and tasks typical for a gateway server 9, such as communicating with off-premises devices over a wide area network 55, and transferring messages from that wide area network to proper member RF nodes 200 via their hub RF nodes 300A-C, 400.

The example of FIG. 5 shows a single instance of gateway server 9. Of course, the gateway functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the gateway server 9 generally are conventional in nature, and it is presumed that those skilled in the art are sufficiently familiar therewith to understand implementation of the present system and associated lighting control technique using suitable configuration and/or programming of such computer system(s).

FIG. 6 is a schematic of an example nodal wireless network 25, specifically illustrating the improvement in wireless channel usage in a nodal wireless network with multiple hub RF nodes 300A, 400. The nodal wireless network 25 includes a gateway server 9 like the gateway server 9 from FIG. 5. The nodal wireless network 25 further includes a wired hub RF node 601, which includes the functionality of the wired hub RF node 400 from FIG. 4. Additionally, the nodal wireless network 25 further includes a hub RF node 602, which includes the functionality of a hub RF node 300A-C from FIGS. 3A-C. The nodal wireless network 25 finally includes member RF nodes 603A-G, which include the functionality of the member RF node 200 from FIG. 2. Any of the nodal wireless network nodes 601, 602, 603A-G can be embodied in any kind of lighting system 20 structure. Meaning, any of these nodes could be a luminaire 200, wall switch 300A, touch screen device 300B, plug load controller 400A, power pack 400B, or any other type of RF node configured to connect to the nodal wireless network 25 and fill the role of member RF node 200 or hub RF node 300A, or wired hub RF node 400.

Figure 6B:
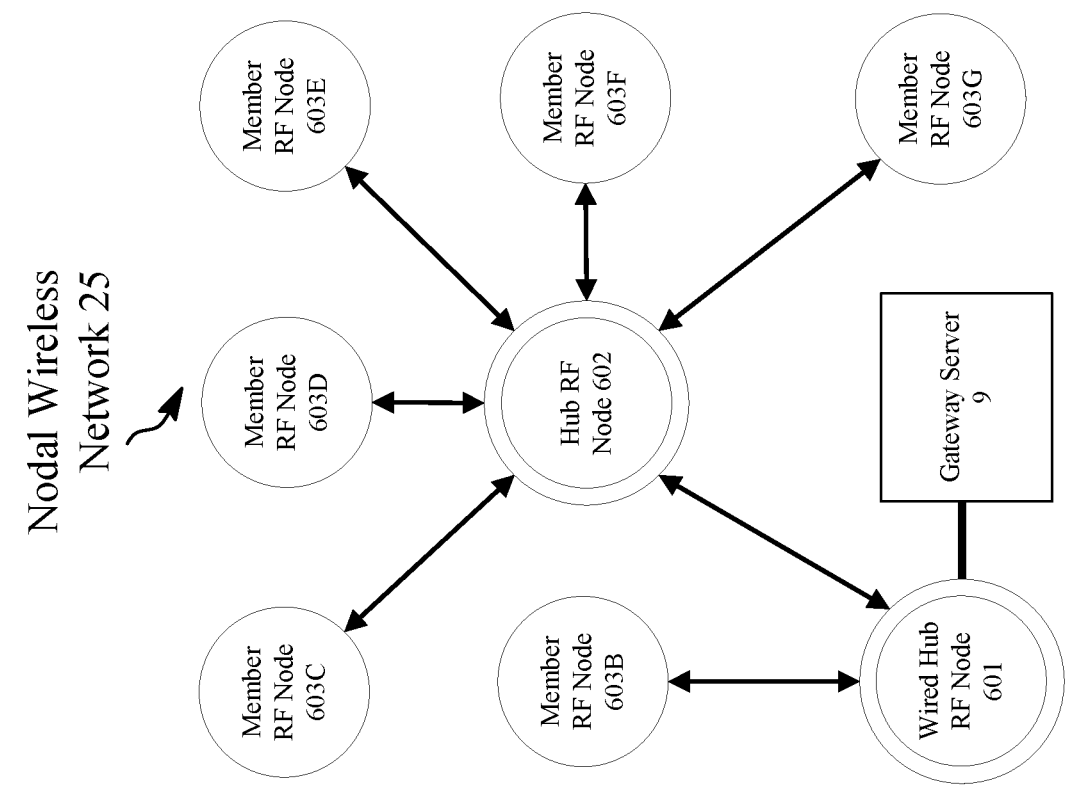
FIGS. 6A-B are schematics of an example nodal wireless RF node network, where
Figure 6A:
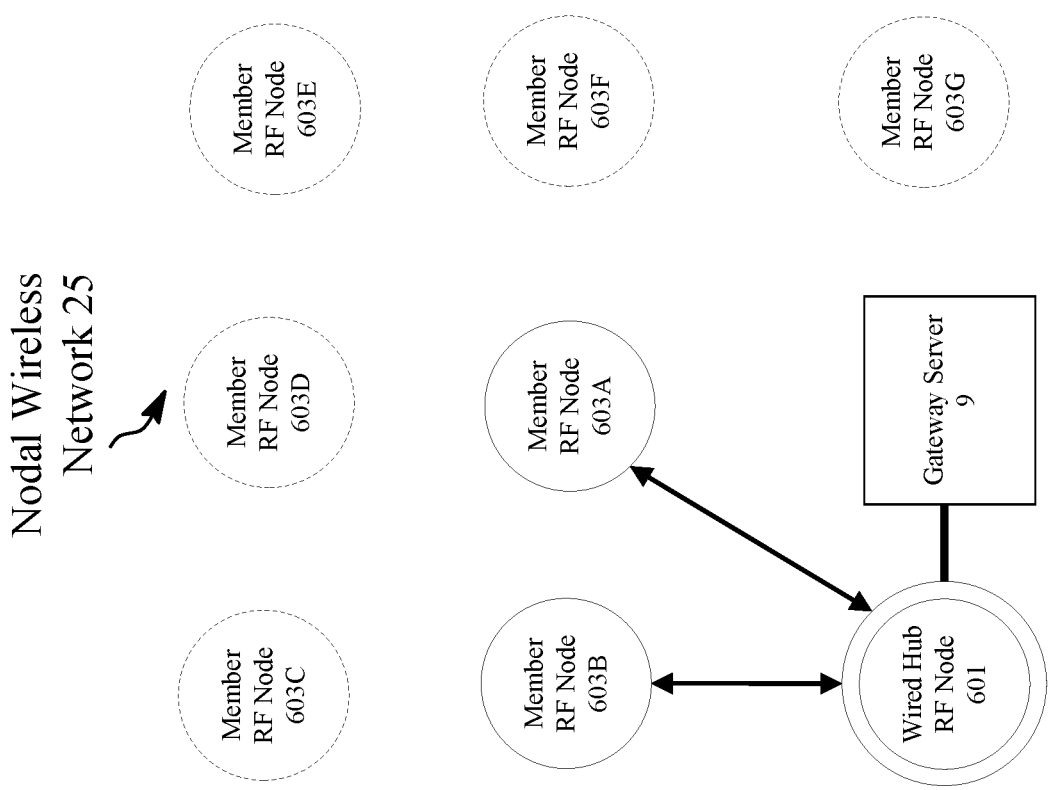

In this example as shown in FIG. 6A, there are eight RF nodes. There is a gateway server 9 with a wired connection to a wired hub RF node 601, which has two RF nodes 603A-B within its wireless radio range. These two nodes are connected to the wired hub RF node 601. There are six RF nodes 603C-G that are not within wireless range of the wired hub RF node 601, but which are in range of the member RF node 603A. These six nodes are not connected to the wired hub RF node 601, either directly or indirectly. To improve network connectivity and connect member RF nodes 603C-G to the gateway server 9 and wired hub RF node 601 indirectly, the gateway server 9 sends a hub request message to member RF node 603A, directing it to configure to operate as a hub RF node 400.

FIG. 6B shows the improved network connectivity. There are still eight nodes, but member RF node 603A is acting as a hub RF node 602. Now, one member RF nodes 603B remains connected to the wired hub RF node 601, but six other member RF nodes 603C-G are connected to the hub RF node 602. Now, the wired hub RF node 601 only connects to two RF nodes, and the hub RF node 602 also connects to the remaining six member RF nodes. Therefore, both the wired hub RF node 601 and the hub RF node 602 have collectively connected all of the member RF nodes 603A-G to the wired hub RF node 601 and the gateway server 9. Consequently the entire nodal wireless network 25 is connected either directly or indirectly to every other RF node 601, 602, 603B-G or the gateway server 9, improving connectivity over the single-hub model connections. When selecting which member node 603A-G to reconfigure into a hub RF node 602, the gateway server may consider which nodes form a control group. A control group comprises a single hub RF node 602 and one or more member RF nodes 603A-G directly connected to the single hub RF node 602. Additionally, within a control group are one or more luminaire RF nodes 201 comprising a light source 219, and one or more control device RF nodes 301 via the nodal wireless network 25. Within the control group is every luminaire RF node 201 coupled to and controlled by the one or more control device RF nodes 301. This is performed because a large amount of the network traffic in a lighting system 20 can be control message from control devices RF nodes 301 to luminaire RF nodes 201, and these messages do not particularly concern other RF nodes. Therefore, by creating control groups with separate hub RF nodes 602, messages between luminaires RF nodes 201 and the control device RF nodes 301 that control them can be isolated to the RF nodes that require the messaged information to properly operate.

Any of the steps or functionality of the member programming 242 and hub programming 342 described herein for the RF nodes (e.g., luminaires 1-8, lighting control device 10, plug load controller 11, and power pack 12) of the lighting system 20 can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A radio frequency (RF) communication system comprising:
 a gateway server, including:
  a gateway processor;
  a gateway network interface, configured for data communication over a network, coupled to the gateway processor;

a gateway wired RF node interface, configured for data communication over a wired connection; and
a gateway memory coupled to the gateway processor of the gateway server;
a plurality of RF nodes connected via a nodal wireless network, the plurality of RF nodes including hub RF nodes and member RF nodes, wherein:
each of the member RF nodes includes:
a member RF node processor,
a member RF node wireless transceiver, configured for data communication over the nodal wireless network, coupled to the member RF node processor of the member RF node;
a member RF node memory coupled to the member RF node processor of the RF node; and
member programming in the RF node memory, wherein execution of the member programming by a respective member RF node processor configures a respective member RF node to implement functions, including functions to:
connect to the nodal wireless network via a respective hub RF node;
receive, from the respective hub RF node via the nodal wireless network, an administrative request message; and
send, to the respective hub RF node via the nodal wireless network, an administrative response message;
each of the hub RF nodes includes:
a hub RF node processor;
a hub RF node wireless transceiver, configured for data communication over the nodal wireless network, coupled to the hub RF node processor of the hub RF node;
a hub RF node memory coupled to the hub RF node processor of the hub RF node; and
hub programming in the hub RF node memory, wherein execution of the hub programming by the respective hub RF node processor configures a respective hub RF node to implement functions, including functions to:
send, to the respective member RF node via the nodal wireless network, the administrative request message;
receive, from the respective member RF node via the nodal wireless network, the administrative response message;
receive a consolidated administrative request message;
select one or more administrative responses from a subset of the member RF nodes;
consolidate the selected one or more administrative responses into a single consolidated administrative response message; and
send the consolidated administrative response message; and
one or more hub RF nodes are wired hub RF nodes, and further include:
an RF node wired gateway interface, configured for data communication over the wired connection, coupled to the gateway wired RF node interface.

2. The RF communication system of claim 1, wherein the administrative request message is a heartbeat message, and the consolidated administrative response message is a consolidated heartbeat message.

3. The RF communication system of claim 1, wherein the administrative request message is a polling message, and the consolidated administrative response message is a consolidated polling message.

4. The RF communication system of claim 1, wherein execution of the member programming by the member RF node processor further configures the respective member RF node to implement functions, including functions to:
configure the respective member RF node to act as one of the hub RF nodes.

5. The RF communication system of claim 4, wherein execution of the member programming by the member RF node processor further configures the respective member RF node to implement functions, including functions to:
receive a hub request message; and
in response to receiving the hub request message, configure the respective member RF node to act as one of the hub RF nodes.

6. The RF communication system of claim 1, wherein execution of the hub programming by the hub RF node processor further configures the respective hub RF node to implement functions, including functions to:
configure the respective hub RF node to act as one of the member RF nodes.

7. The RF communication system of claim 1, wherein each member RF node has a single connection to the nodal wireless network; and
the single connection to the nodal wireless network of the respective member RF node directly connects via the respective hub RF node.

8. The RF communication system of claim 1, wherein the hub node wireless transceiver of the respective hub RF node communicates to the respective member RF node using a first frequency band, and the hub node wireless transceiver of the respective hub RF node communicates to a respective wired hub RF node using a second frequency band.

9. The RF communication system of claim 1, wherein execution of the hub programming by the hub RF node processor further configures the respective hub RF node to implement functions, including functions to:
forward messages from a first member RF node to a second RF member node;
forward messages from the first or second member RF nodes to a another hub RF node; and
forward messages from the other hub RF node to the first or second member RF nodes.

10. The RF communication system of claim 1, wherein:
the member RF node memory of each member RF node further includes:
a member RF node status, comprising operational data related to the respective member RF node;
the hub RF node memory of each hub RF node further includes:
a hub RF node status, comprising operational data related to the respective hub RF node indicating whether the respective RF node acts as a member;
a member RF node status array, comprising the member RF node status of one or more member RF nodes directly connected to the respective hub RF node;
an aggregated member RF node status, comprising an aggregation of the member RF node status in the member RF node status array; and
the gateway memory of the gateway server further includes:
an aggregated member RF node status array, comprising the aggregated member RF node status of one or more hub RF nodes connected to the gateway server.

11. The RF communication system of claim 1, wherein execution of the hub programming by the hub RF node processor further configures a respective wired hub RF node to implement functions, including functions to:
   analyze network traffic over the nodal wireless network; and
   send a hub request message.

12. The RF communication system of claim 1, wherein execution of the gateway programming by the gateway processor further configures the gateway server to implement functions, including functions to:
   analyze network traffic over the nodal wireless network; and
   send a hub request message.

13. The RF communication system of claim 1, wherein the RF communication system is a wireless industrial device control system.

14. The RF communication system of claim 1, wherein the RF communication system is a wireless lighting system.

15. The RF communication system of claim 14, wherein:
   the plurality of RF nodes include luminaire RF nodes comprising a light source, and lighting control device RF nodes coupled to control one or more luminaire RF nodes via the nodal wireless network; and
   the system further includes one or more control groups comprising:
      a single hub RF node and one or more member RF nodes directly connected to the single hub RF node; and
      a lighting control device RF node and each luminaire RF node coupled to the lighting control device.

16. A method comprising steps of:
   connecting a first member radio frequency (RF) node of a plurality of RF nodes to a nodal wireless network via a first hub RF node of a plurality of hub RF nodes;
   receiving at the first member RF node an administrative request message, from the first hub RF node via the nodal wireless network;
   sending from the first member RF node an administrative response message, to the first hub RF node via the nodal wireless network;
   receiving at the first hub RF node a consolidated administrative request message;
   selecting one or more administrative response messages from a subset of the RF nodes;
   consolidating the selected administrative response messages into a single consolidated administrative response message; and
   sending from the first hub RF node the consolidated administrative response message.

17. The method of claim 16, further comprising:
configuring the first member RF node to act as one hub RF nodes; and
configuring the first hub RF node to act as one of the member RF nodes.

18. The method of claim 16, further comprising:
storing a respective member RF node status at a respective member RF node;
storing a member RF node status array including the respective member RF node status of a subset or all of the member RF nodes at the first hub RF node; and
calculating an aggregated member RF node status at the first hub RF node.

19. The method of claim 18, further comprising:
analyzing network performance based on the aggregated member RF node status; and
optimizing network performance based on the analyzed network performance.

* * * * *